United States Patent
Huang et al.

(10) Patent No.: US 8,725,567 B2
(45) Date of Patent: May 13, 2014

(54) TARGETED ADVERTISING IN BRICK-AND-MORTAR ESTABLISHMENTS

(75) Inventors: Xuedong D. Huang, Bellevue, WA (US); William H. Gates, III, Medina, WA (US); Eric J. Horvitz, Kirkland, WA (US); Joshua T. Goodman, Redmond, WA (US); Bradly A. Brunell, Medina, WA (US); Susan T. Dumais, Kirkland, WA (US); Gary W. Flake, Bellevue, WA (US); Trenholme J. Griffin, Bainbridge Island, WA (US); Oliver Hurst-Hiller, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1759 days.

(21) Appl. No.: 11/427,761

(22) Filed: Jun. 29, 2006

(65) Prior Publication Data

US 2008/0004950 A1 Jan. 3, 2008

(51) Int. Cl.
*G06Q 30/00* (2012.01)

(52) U.S. Cl.
USPC ...................................... 705/14.49

(58) Field of Classification Search
USPC ........................................... 705/14
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |

(Continued)

FOREIGN PATENT DOCUMENTS

| WO | 9800787 | 1/1998 |
|---|---|---|
| WO | WO9800787 (A1) | 1/1998 |

OTHER PUBLICATIONS

Andy Harter, et al., A Distributed Location System for the Active Office, IEEE Network, 1994, pp. 62-70.

(Continued)

*Primary Examiner* — Alvin L Brown
(74) *Attorney, Agent, or Firm* — Dan Choi; Carole Boelitz; Micky Minhas

(57) ABSTRACT

Architecture for presenting advertisements in realtime in retail establishments. A sensor component includes sensors for collecting information about a customer or group of customers as they move through the store. The sensors can include capability for image processing, audio processing, light sensing, velocity sensing, direction sensing, proximity sensing, face recognition, pose recognition, transaction recognition, and biometric sensing, for example. A customer component analyzes the information and generates a profile about the customer. Advertisements are selected for presentation that target the customers as they walk in proximity of a presentation system of the store. An advertisement component facilitates dynamic presentation of a targeted advertisement to the individual as a function of the profile. The customer component can infer information during analysis using machine learning and reasoning.

18 Claims, 16 Drawing Sheets

(56) References Cited

U.S. PATENT DOCUMENTS

| | | | |
|---|---|---|---|
| 6,842,877 B2 | 1/2005 | Robarts et al. | |
| 6,968,333 B2 | 11/2005 | Abbott et al. | |
| 7,010,501 B1* | 3/2006 | Roslak et al. | 705/26 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2004/0153373 A1 | 8/2004 | Song et al. | |
| 2004/0254835 A1 | 12/2004 | Thomas et al. | |
| 2005/0021397 A1 | 1/2005 | Cui et al. | |
| 2005/0034078 A1 | 2/2005 | Abbott et al. | |
| 2006/0074769 A1* | 4/2006 | Looney et al. | 705/26 |
| 2006/0168195 A1* | 7/2006 | Maturana et al. | 709/224 |
| 2007/0033113 A1* | 2/2007 | Trew | 705/26 |
| 2007/0192687 A1* | 8/2007 | Simard et al. | 715/523 |
| 2008/0215391 A1* | 9/2008 | Dowling et al. | 705/7 |

OTHER PUBLICATIONS

Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In the 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Mark Billinghurst, Research Directions in Wearable Computing, University of Washington, May 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
U.S. Appl. No. 60/416,144, Goerges Harik, et al.
Billinghurst, et al., "An Evaluation of Wearable Information Spaces", Proceedings of the Virtual Reality Annual International Symposium, 1998, 8 pages.
Billinghurst, et al., "Wearable Devices: New Ways to Manage Information", IEEE Computer Society, Jan. 1999, pp. 57-64.
Billinghurst, "Research Directions in Wearable Computing", University of Washington, May 1998, 48 pages.
Chen, et al., "A Survey of Context-Aware Mobile Computing Research", Dartmouth Computer Science Technical Report, 2000, 16 pages.
Harter, et al., "A Distributed Location System for the Active Office", IEEE Network, 1994, pp. 62-70.
Horvitz, et al., "Attention-Sensitive Alerting in Computing Systems", Microsoft Research, Aug. 1999, 26 pages.
Horvitz, et al., "In Pursuit of Effective Handsgree Decision Support: Coupling Bayesian Ingerence, Speech Understanding, and User Models", 1995, 8 pages.
International Search Report dated Sep. 29, 2003, for PCT Application Serial No. PCT/US00/20685, 3 pages.
Joachims, "Text Categorization with Support Vector Machines: Learning with Many Relevant Features", Machine Learning, European Conference on Machine Learning, Apr. 21, 1998, pp. 137-142.
Losee, Jr, "Minimizing Information Overload: the Ranking of Electronic Messages", Journal of Information Science 15, Elsevier Science Publishers B.V., 1989, pp. 179-189.
Office action for U.S. Appl. No 11/427,764, mailed on May 9, 2013, Huang tal., "Web-Based Targeted Advertising In A Brick-And-Mortar Retail Establishment Using Online Customer Information", 17 pages.
Rhodes, "The Wearable Remembrance Agent: A System for Augmented Memory", In Personal Technologies Journal Special Issue on Wearable Computing, Personal Technologies (1997), 12 pages.
Rhodes, et al., "Remembrance Agent: A Continuously Running Automated Information Retrieval System", The Proceedings of The First International Conference on The Practical Application Of Intelligent Agents and Multi Agent Technology, 1996, pp. 487-495.
Rhodes, "The Wearable Remebrance Agent: A System for Augmented Memory", The Proceedings of The First International Symposium on Wearable Computers, Oct. 1997, pp. 123-128.

(56) References Cited

OTHER PUBLICATIONS

Schilit, "A System Architecture for Context-Aware Mobile Computing", Columbia University, 1995, 153 pages.

Schilit, et al., "Context-Aware Computing Applications", In Proceedings of the Workshop on Mobile Computing Systems and Applications, Dec. 1994, pp. 85-90.

Schilit, et al., "Customizing Mobile Applications", Proceedings USENIX Symposium on Mobile and Location Independent Computing, Aug. 1993, 9 pages.

Schilit, et al., "Disseminating Active Map Information to Mobile Hosts", IEEE Network, 1994, pp. 22-32, vol. 8, No. 5.

Schilit, et al., "The PARCTAB Mobile Computing System", IEEE WWOS-IV, 1993, 4 pages.

Spreitzer, et al., "Architectural Considerations for Scalable, Secure, Mobile Computing with Location Information", In the 14th International Conference on Distributed Computing Systems, Jun. 1994, pp. 29-38.

Spreitzer, et al., "Providing Location Information in a Ubiquitous Computing Environment", SIGOPS 1993, pp. 270-283.

Spreitzer, et al., "Scalable, Secure, Mobile Computing with Location Information", Communications of the ACM, Jul. 1993, 1 page, vol. 36- No. 7.

Starner, "Wearable Computing and Contextual Awareness", MIT, Jun. 1999, 248 pages.

Theimer, et al., "Operating System Issues for PDAs", In Fourth Workshop on Workstation Operating Systems, 1993, 7 pages.

Want, et al., "Active Badges and Personal Interactive Computing Objects", IEEE Transactions on Consumer Electronics, 1992, 11 pages, vol. 38- No. 1.

Want, et al., "The Active Badge Location System", ACM Transactions on Information Systems, vol. 10, No. 1, Jan. 1992, pp. 91-102.

Weiser, "Some Computer Science Issues in Ubiquitous Computing", Communications of the ACM, Jul. 1993, pp. 75-84, vol. 36-No. 7.

Weiser, "The Computer for the 21st Century", Scientific American, Sep. 1991, 8 pages.

Workshop on Wearable Computing Systems, Aug. 19-21, 1996.

* cited by examiner

TARGETED ADVERTISING IN BRICK-AND-MORTAR ESTABLISHMENTS

CROSS REFERENCE TO RELATED APPLICATIONS

This application is related to co-pending U.S. patent application Ser. No. 11/427,764, entitled "WEB-BASED TARGETED ADVERTISING IN A BRICK-AND-MORTAR RETAIL ESTABLISHMENT USING ONLINE CUSTOMER INFORMATION" (Huang, et al.) filed of even date, the entirety of which is incorporated herein by reference.

BACKGROUND

The Internet provides unprecedented access for advertising to an ever-increasing number of potential customers ranging from businesses to individuals. Money expended for online advertising in the United States alone, is in the billions of dollars per year, and continues to increase with no end in sight. A company contacts the website owner and procures ad space on one or more web pages hosted at that site. Ads can be presented on web pages in different forms and types of multimedia content where the size of the web page real estate can be a cost factor, as well as the position of the ad on the web page. Accordingly, businesses recognize the value in online advertising and continue to seek better ways to reach these potential customers with information about their products and services.

At a high level, conventional advertising techniques typically employ mass media (e.g., television and radio) and heavily traveled areas such as major highways as principal means for reaching large numbers of viewers and listeners with the hope that he or she will see the advertisement (e.g., in the form of billboards or television commercials) and make a purchase. However, such techniques are limited, since the advertisement has to be created to reach a broad spectrum of potential customers.

The Internet and its myriad of websites and millions of users provides a convenient and more effective mechanism for presenting advertisements. Thus, a better solution would be to reach more individuals at a lower level, such as the capability of going "one-on-one" with each potential customer and to target each individual based on his or her preferences, tastes, buying habits, wants, needs, and so on, to offer the most effect means for making a sale.

In that online user activities and access information can now be tracked in the form of cookies, for example, thereby providing information about the buying habits, goals, intentions, and needs large numbers of users, it then becomes possible to target groups of users, for example, based on this information alone. Accordingly, the quality and value received from online advertising can translate into potentially huge returns to the advertising dollars of businesses. In view of such lucrative opportunities, businesses continue to search for new and more effective mechanisms for advertising.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention provides for presenting to a customer advertising that is targeted to that customer. The system can operate within a brick-and-mortar facility to present the targeted advertising to the customer(s) as they walk through the facility. A variety of sensors and sensing systems (e.g., face recognition, pattern recognition, proximity sensors, audio sensors, light sensors, and transaction recognition) can be employed to glean as much information as possible about a potential customer or group of customers within close proximity to a particular display device. Based on the available information, one or more advertisements can then be selected for display to the customer or group of customers.

For example, if, based on size, height and weight, it is determined that a customer is a male, and the display is mounted close to both ladies apparel as well as cameras, the system in accordance with the invention can likely inform the customer that "cameras are on sale to your left" since a male is more likely to buy a camera, rather than female clothing.

Moreover, remote advertisers can dynamically update and convey advertisements in realtime within traditional retail brick-and-mortar establishments, in contrast to static ads that are typically updated weekly or monthly. Additionally, each ad packet (or bundle of selected advertisements) can be customized per potential customer to increase likelihood purchase. For example, the approaching customer can be recognized as Dave Nelson, a regular customer who prefers to shop cameras, based on face recognition. As he approaches the camera counter, a speaker can be controlled to output "Hello Dave—just wanted to let you know we have a sale on digital cameras today".

The disclosed architecture is not limited to displays, and can be applied within the context of Internet-linked speakers, for example, that play targeted audio packets of advertising data when a potential customer is within range.

Accordingly, the invention disclosed and claimed herein, in one aspect thereof, comprises a sensor component that includes sensors for collecting information about a customer or group of customers as they move through the store. The sensors can include capability for image processing, audio processing, light sensing, velocity sensing, direction sensing, proximity sensing, face recognition, pose recognition, transaction recognition, and biometric sensing, for example. A customer component analyzes the information and generates a profile about the customer. Advertisements are selected for presentation that target the customers as they walk in proximity of a presentation system of the store. An advertisement component facilitates dynamic presentation of a targeted advertisement to the individual as a function of the profile. The customer component can infer information during analysis using machine learning and reasoning.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
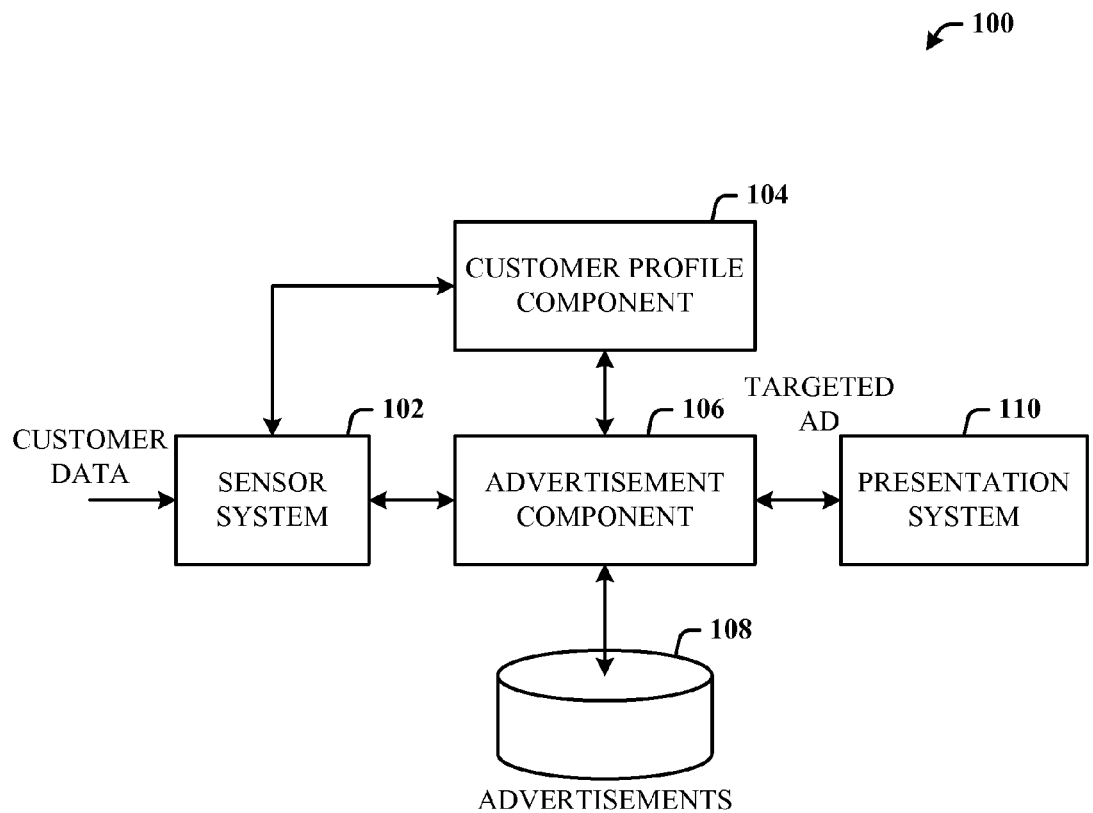
FIG. 1 illustrates a computer-implemented system that facilitates presentation of targeted advertisements to an individual according to a novel aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The subject innovation introduces architecture for presenting (e.g., displaying via a monitor or display) advertisements to customers within a brick-and-mortar establishment as they move throughout the store. The advertisements are selected for targeting the customer as they approach a display, for example. A sensor system monitors and captures information about the customer as the customer moves around in the store, and also obtains historical data about the customer. Based on at least this information, one or more advertisements can be selected and displayed to the customer as s/he approaches a display positioned in the store.

For example, if the sensor system captures information related to the customer's clothing (e.g., sports shirt with team emblem) or what products the customer is carrying to be purchased (e.g., basketball), the system can analyze captured images, determine that the customer is interested in sports products, retrieve advertisements related to sports events or sales on sports equipment, and present these advertisements as the customer approaches a display positioned in the store, thereby enticing the customer to make another purchase of other products and/or services. Other specific capabilities are described herein.

Referring initially to the drawings, FIG. 1 illustrates a computer-implemented system 100 that facilitates presentation of targeted advertisements to an individual according to a novel aspect. The system 100 includes a sensor component 102 of, for example, a brick-and-mortar retail establishment, that collects sensor information associated with an individual (or other entity such as a group of individuals), and utilizes the sensor information to present targeted advertising to the individual or group of individuals.

Today, millions of users perform online searching and make online purchases of articles of commerce related to products and/or services. In many instances, this process or parts thereof can be tracked and stored. In other words, the fact that the user performed a search, the topic(s) of the search, the websites visited, pages visited on each website, and if a purchase was made, what was purchased, how the transaction was conducted, modes and delivery times, and so on, can be known and recorded. Bits and pieces of this information can be stored at each website visited and/or on the user's local computer such that a visit by the user to the website at a later time can be expedited by accessing the previously stored interaction information.

In one aspect, the disclosed architecture can enhance the brick-and-mortar shopping experience at retail establishments by accessing this web-based interaction information, if desired, selecting one or more advertisements based on this web-based interaction information, and pushing these advertisements for presentation to the associated user (or customer) when the user is detected as presently shopping at the retail establishment.

In another aspect, previous shopping history and/or interaction information can be accumulated based only on user activity while in the retail establishment, and not based on web-based online shopping. In yet another aspect, the combination of web-based user activity and shopping activity while in the establishment can be analyzed and processed to select the desired advertisements and to present the ads to the user via displays or other types of multimedia presentation systems when the user is detected in close proximity thereto.

Accordingly, the system 100 can also include a customer profile component 104 that analyzes the sensor information and generates a profile about the individual (or group of individuals) that can be used to select one or more advertisements for presentation to the individual. The profile can be developed based only on first-instance information (e.g. for a customer who is visiting the store for the first time) or from historical shopping information collected about the customer from past purchase history. Additionally, the customer can provide preferences information about articles of commerce (e.g. products and/or services) which s/he prefers to buy or will not buy. As indicated supra, the profile can also include interaction data tracked and recorded when the user conducts online purchases.

It is within contemplation of the subject innovation that customer offline behavior can also be considered. For example, purchases by a customer at a brick-and-mortar grocery store are not online purchases. However, information about the customer and/or the purchases can be logged by the store. This information can be utilized as historical information for developing the customer profile, for example.

It is also considered part of the innovation that customers can be given unilateral control of their profile. Thus, when shopping, the system 100 facilitates access to the customer profile according to what the customer wants to be part of the profile for processing. As described hereinbelow, profile masking can also be employed to filter profile information, as desired. In one implementation, this masking process can also be under control of the customer, thereby managing what the system will utilize for targeted advertising when the customer/user shops at that establishment.

Accordingly, based in part on the customer profile, an advertisement component 106 accesses an advertisement datastore 108 to retrieve advertisements for presentation to the individual via a presentation system 110 (e.g., a multimedia presentation system). The system 100 facilitates dynamic presentation of targeted advertising to the individual as a function of the profile. The datastore 108 can be a single system located wholly offsite from the store, totally onsite of the store, and/or include data that is distributed partly onsite and offsite.

The sensor system 102 can employ any number of different sensor types. For example, image processing, audio processing, light sensing, velocity sensing, direction sensing, proximity sensing, face recognition, pose recognition, transaction recognition, and biometric sensing can be utilized to glean as much information as possible about a potential customer or group of customers within close proximity to a particular display device or multimedia presentation system, and based on the available information for selecting an advertisement to be displayed (or presented). For example, if based on size, height and weight it is determined that an individual's gender is male, and the display is close to both ladies apparel as well as cameras a system in accordance with the invention would likely inform the user that cameras are on sale to your left, since a male is more likely to buy a camera than female clothing.

The disclosed architecture is not limited simply to ad presentation by way of displays, but can also be applied within the context of network-linked speakers (e.g., the Internet) that play targeted audio packets of advertising data when a potential customer is within range display and/or speakers.

Additionally, the architecture allows for remote or third-party advertisers to dynamically update and download advertisements to the advertisement datastore 108 in realtime within traditional retail brick-and-mortar establishments as compared to static ads (that are updated weekly or monthly). Moreover, each advertisement packet can be customized per potential customer to increase the likelihood of purchase by, for example, recognizing the approaching person such that a name can be applied to personalize the shopping experience.

In one alternative implementation, each person can carry a device most, if not all, of the time, that stores user profile information that is automatically accessible by the brick-and-mortar establishment. This is described in more detail in FIG. 14.

Figure 2:
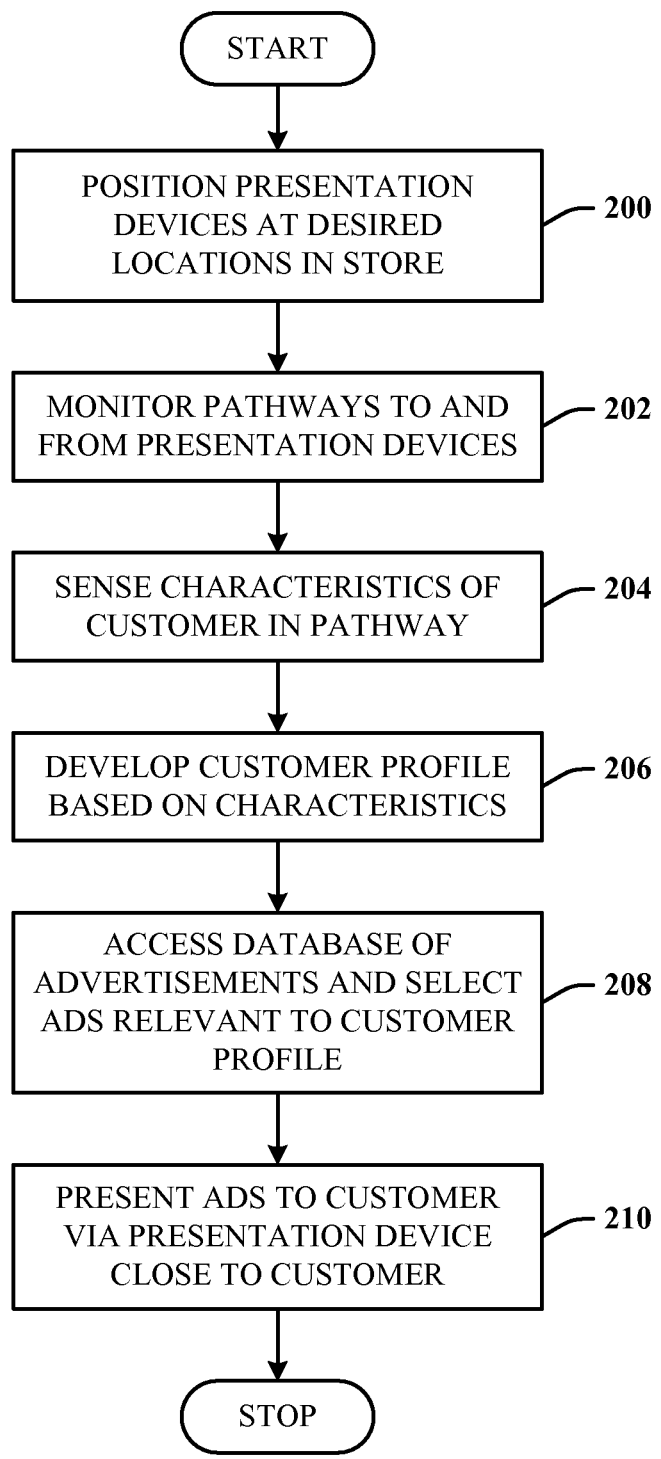
FIG. 2 illustrates a methodology of advertising content to customers of a retail establishment in accordance with an innovative aspect.

FIG. 2 illustrates a methodology of advertising content to customers of a retail establishment in accordance with an innovative aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, presentation devices and/or systems (e.g., displays and/or multimedia presentation systems) are mounted or positioned throughout the retail establishment. At 202, utilizing the sensing system, pathways (e.g. aisles) to and from the presentation devices and/or systems of the store is monitored for customers, customer behavior, and customer characteristics. At 204, characteristics of the customer or group of customers in a pathway are sensed. At 206, a customer profile is developed and/or retrieved for processing. At 208, an advertisement database is accessed and one or more advertisements relevant to the profile retrieved. At 210, the advertisements are presented to the customer via the presentation devices and/or systems when the customer is within a predefined proximity thereof.

Figure 3:
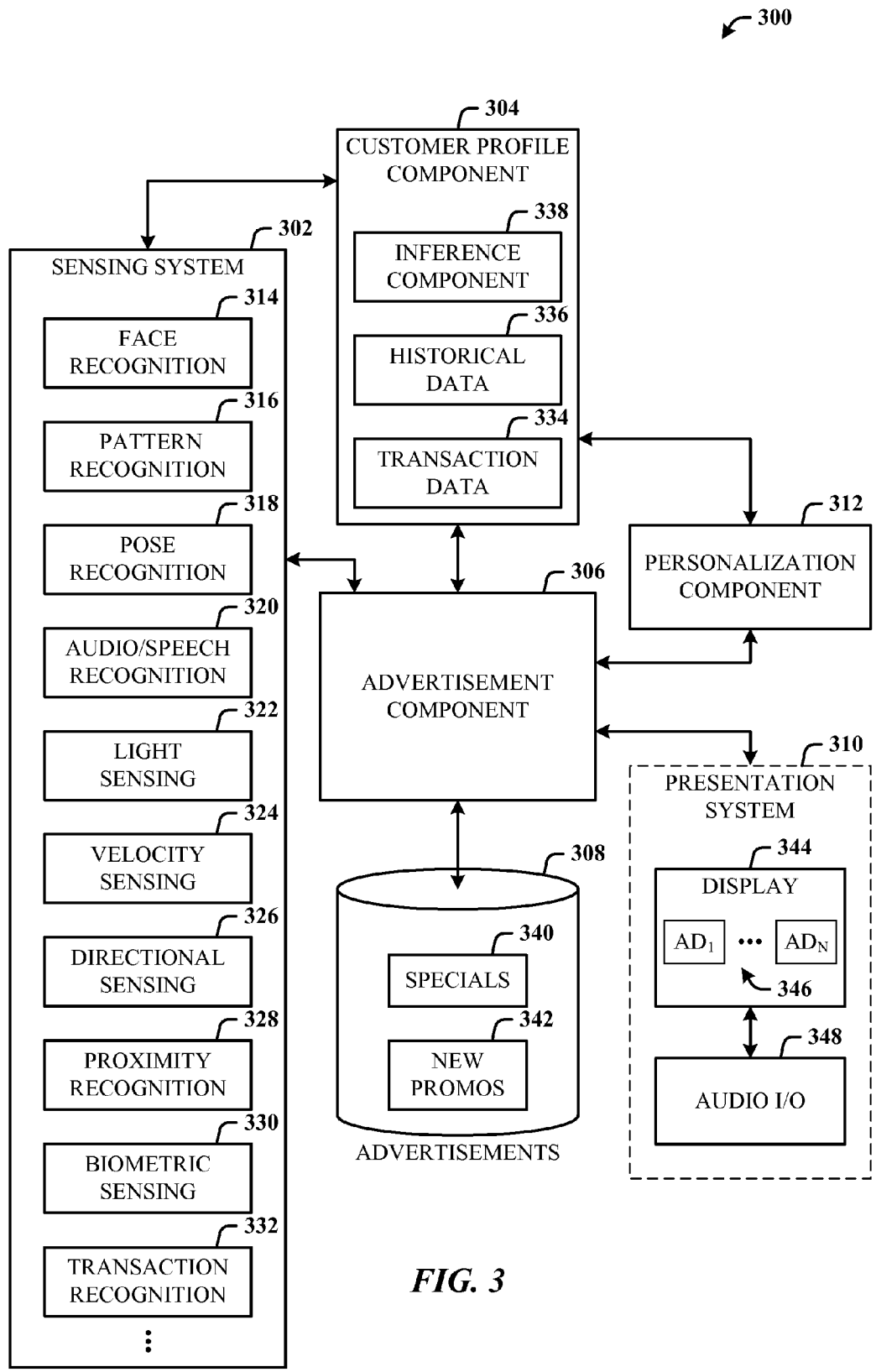
FIG. 3 illustrates a detailed block diagram of an alternative system that facilitates targeted advertising in a brick-and-mortar establishment in accordance with another aspect.

Referring now to FIG. 3, there is illustrated a detailed block diagram of an alternative system 300 that facilitates targeted advertising in a brick-and-mortar establishment in accordance with another aspect. The system 300 includes a sensing system 302, a customer profile component 304, an advertising component 306, an advertisements datastore 308, and a presentation system 310, all similar respectively to items 102, 104, 106, 108, and 110 of FIG. 1. Additionally, the system 300 includes a personalization component 312 for personalizing advertisements or other information presented to a customer or group of customers.

A variety of different types of sensors and sensing subsystems can be employed as part of the sensing system 302. For example, recognition systems for face recognition, transaction recognition, audio/speech recognition, pattern recognition, and pose recognition provide imaging and analysis related to the desired features to be recognized. A face recognition subsystem 314 can capture facial features related to eye color, hair color and hair style, skin color and features (e.g., cuts and blemishes), general shape of face, eyes, lips, cheek bones, etc., by taking a digital image of a customer and comparing that image to a facial image database.

A pattern recognition subsystem 316 facilitates pattern recognition, which is a field in machine learning that classifies data patterns, and can include image processing related to spatial orientations and distributions, for example, as can be associated with discerning groups of individuals.

Pose recognition can be provided by a pose recognition subsystem 318 to capture images related to the overall pose of an individual (e.g., bending down, leaning, reaching, arms up . . . ) as well as facial poses or demeanor information such as frowning, scowling, wincing, smiling, and so on. The facial pose can be used for determining a reaction by the individual to pricing of a product or service, or reaction to an advertisement, for example. In one example, both pose and facial recognition can be employed in combination to determine the gender of a customer.

The sensor system 102 can also provide capabilities for audio/speech recognition and processing via an audio/speech recognition subsystem 320. For example, if the customer is speaking into a cell phone as s/he is walking through the store, speech recognition can be employed to receive and process speech signals which can be used to trigger retrieval and presentation of products and/or services related to the ongoing conversation of the customer, when the customer approaches a multimedia system. For example, if the system 300 processes signals that indicate the customer is excited about an upcoming birthday party, as determined by voice signals, advertisements can be retrieved and presented for party supplies. Contrariwise, if voice signal processing indicates that the customer is depressed, advertisements related to anti-depressant products and/or services can be retrieved and presented.

In another example related to audio processing, if the customer is listening to music as s/he moves through the store, the sensor system 302 can receive and process the audio signal to determine what music to which the customer is listening. Accordingly, once determined, the system 300 can retrieve and present advertising related to specials currently ongoing in the music department that may be related to the type or genre of music being heard. Carrying this example further, the related genre of music can be played (or associated music videos played) as the customer approaches the display system. This can be presented in combination with an advertisement for the same music CD, for example.

A light sensing subsystem 322 of the sensing system 302 facilitates determining and/or controlling lighting aspects for the customer. For example, if the customer is approaching a product that would be viewed more effectively with lower lighting, the system 302 can extract a customer profile to determine if the customer has interacted with this or similar lighting situations in the past, to provide some indication or likelihood that again, the customer would prefer that the lighting be similarly controlled in this situation. The light sensing system 322 can also provide the capability of operating optical sensors that facilitate determining proximity of the customer to a presentation system. For example, if the advertisements have been retrieved and processed for presentation, tripping of an optical sensor can trigger discontinuation of currently running ads for a previous customer and presentation of the targeted ads for this customer.

Velocity sensing can be facilitated by a velocity sensing subsystem 324 of the system 302. Velocity detection or the speed at which a customer is moving can be utilized to determine the speed and/or duration at which an advertisement will be presented. This can further be utilized for filtering the type of ad to be presented. For example, if it is determined that the customer is moving quickly toward the presentation system, it can be inferred that the customer is in a hurry, and that they are unlikely to pause to perceive an ad. Accordingly, a very short ad can be retrieved and presented that can be perceived (e.g., viewed or heard) in passing.

Similarly, based on past customer profile information, it can be inferred that since the customer is moving quickly this time, and that in the past when the customer was moving quickly up this aisle, they selected and purchased a certain product, it can be inferred that they will again purchase the same product. Accordingly, a brief greeting and departing announcement can be made.

Where radio frequency identification (RFID) devices are employed on products, it can be more affirmatively determined what product was selected, and also, the location or proximity of the user relative to a presentation system. Thus, advertising can be more focused when the customer comes into range of a presentation system.

The sensing system 302 can also employ a directional sensing subsystem 326 for determining the direction or heading of a customer or group of customers. Knowing this information, the system 300 can anticipate where the customers are going, and present advertisements, accordingly. Moreover, given speed and heading, advertisements can be customized for the location at which the customer is expected to pass by or stop. Directional sensing can be employed to determine if the customer (or group of customers) is moving toward or away from a certain location (e.g., where a display is mounted or a product is located).

For example, if, based on other recognition information and preferences or profile information, the customer is determined to be moving toward a display in the store, and the customer name is now known and is a regular customer who enjoys cameras, greetings information can be presented that personalizes the greeting to the specific customer, such as "Hello Dave—just wanted to let you know we have a sale on digital cameras today". It is within contemplation that as the customer moves away from a location (e.g., a store multimedia presentation), as determined by directional sensing, the system 300 can play departing information such as "Thank you, Dave. Have a nice day!" or reminder information such as "Remember to pick up the new development software on the way out".

Social relationships can be considered in making inferences and also in extending inferences for particular people to others. For example, the presence of two people who are romantically involved and who are passionate about each other can be recognized. Likewise, a nuclear family could be inferred through visual analysis of the sizes and shapes of people within a cluster of people, and also via the consideration of temporospatial patterns of behavior and interaction (e.g., parents showing "herding" behaviors).

Continuing in this vein, social inferences can be employed to extend and reason about knowledge built up about a person. For example, consider that a person named Tom Martin is recognized at a retail organization, and a rich profile containing statistical knowledge about Tom has been built up over time. The model includes information that represents Tom's deep interests in sporting goods and accessories, especially items associated with golfing. Gerry Stuart has never been seen before, but one day shows up with Tom at the facility. By examining the size and shape of Gerry, as well as the interactions they are having, including their proximity, gestures, and communication, a social connection of a good friend, with likely shared sporting interests might be inferred. Thus, aspects of Tom's profile or related associational information, including preferences might be transferred to Gerry, and annotated as coming via a social connection to Tom. This information can be used to provide services and advertising to Gerry at this or other locations.

Statistical machine learning and reasoning methods can be employed not only to transfer information among people, but can also be employed to learn how to recognize social relationships, and also how to perform such transfers, such as transfers of profile information among family (e.g., spouses, siblings, children, parents), friends, and colleagues.

A proximity sensing or recognition subsystem 328 can provide imaging as a means for determining how close a customer is to a presentation system. This can be utilized in lieu of optical sensors, if desired, or in environments where physical sensors cannot be easily deployed. Proximity sensors facilitate determining how close the customer is to a location when in the store, and more importantly, in relation to a display system or multimedia presentation system that presents the advertisements. In one implementation, it is desirable to trigger presentation of an advertisement to a specific customer rather than a group of customers as the customer approaches a certain store location. In another implementation, it is desirable to have the capability to present advertisements or other information to groups of customers within a predetermined distance of the display system or multimedia presentation system. Thus, proximity sensors can be employed to indicate the approximate location of one or more customers for advertisement presentation.

A biometric sensing subsystem 330 can be utilized to monitor biometric parameters of a customer. For example, thermal imaging can be employed to monitor customer temperature. Tactile monitors (e.g., thermocouples) can be employed to monitor skin temperature of the customer when the customer touches an instrumented part of the store (e.g., rack, shelf, checkout counter, . . . ). This information can also be utilized to infer that the customer may prefer to see one type of ad over another.

A transaction recognition subsystem 332 can capture and analyze images related to initiating or processing a purchase transaction during checkout. For example, if it is determined that the customer typically buys candy or magazines next to the checkout counter, the transaction system can capture this for analysis for later use and customer profile development or updating, as well as facilitate ads for presentation while at the checkout counter.

Other sensing subsystems can be employed as desired. For example, retinal recognition systems, pressure sensing, load cell sensing, linear displacement sensing, humidity sensing, altitude sensing, geolocation sensing (e.g., global positioning system), and so on.

The customer profile component 304 facilitates the creation and updating of customer or customer group profiles. In support thereof, the profile component 304 can include transaction data 334 associated with transactions conducted by the customer. Historical data 336 captures information related to any past visit, transaction, interaction, user profile, group profile, customer accounts, and so on.

The profile component 304 can also include an inference component 338 for making an inference about certain aspects that can include the system, customers, and/or establishment, for example. Such inferencing capability can be provided as part of a machine learning and reasoning component that is described infra.

The advertisement component 306 interfaces to both the sensing system 302 and the profile component 304 to receive and/or select advertisements from the datastore 308 associated with sensor data being received and analyzed. Once selected and processed for presentation, the advertisement component 306 transmits the targeted ad(s) to the presentation system 310 for presentation to the customer(s).

The advertisement datastore 308 can include advertising data related to special promotions 340 and new promotions 342, for example. The datastore 308 can also include ads that have been downloaded in realtime and ads that are stored therein and are being updated, for example.

The presentation component 310 of system 300 can include various devices and software that facilitate the input and output (I/O) of information (e.g., speakers, microphones, displays, keyboards, input devices, and wireless interfaces for wireless devices used by the customers). The presentation system 310 can include at least one display 344 (e.g., LCD-liquid crystal display and/or plasma displays) for presenting one or more advertisements 346 (denoted $AD_1, \ldots, AD_N$, where N is an integer), and an audio I/O system 348 such as speakers and microphones for receiving customer speech or other speech or audio signals, and speakers for outputting audio signals associated with the advertisements or other information desired to be presented.

For example, the retail establishment can have multiple displays positioned at locations of the store at which a customer will likely be able to see and/or hear information being output. These locations can include at the ends of aisles, in the product shelves, hanging from the ceiling, on a stand, outside the store, in the parking lot, at entrances and exits, at the checkout counter, and so on, so as to optimize the likelihood that when information is presented, it will be perceived. The presentation system 310 can be multiple presentation systems that are mounted throughout the establishment and include wired and/or wireless systems capability for convenient and easy relocation.

The personalization component 312 of system 300 facilitates personalizing an advertisement to the customer or group of customers. Given profile information, personalization need not include a customer name; however, this can be accomplished based on inferences made about shopping interaction, recognition system data, and so on. For example, if based on size, height and weight that an individual is a male, routinely selects a product for purchase on a given day and time, there can be computed a high likelihood that the man's name could be associated with a customer profile having a first name of Dave. Advertisements can then be processed to include introductions or interaction information that utilizes the name Dave. Personalization data can also include other properties or aspects of the customer such as clothing type, age, gender, whether recognized as happy or sad, in a hurry or not, and so on.

Learned profiles for groups of people or for individuals, whether learned via statistical methods across populations or for individuals, can be shared electronically among outlets of a franchise, or related, affiliated retailers, so retailers can custom-tailor services and specials to particular people or groups at all of their locations. Knowledge that such rich custom-tailoring likely provided at particular centers can make services more pleasant and/or efficient at these centers, building loyalty to the organizations that have access to a user's preferences.

Figure 4:
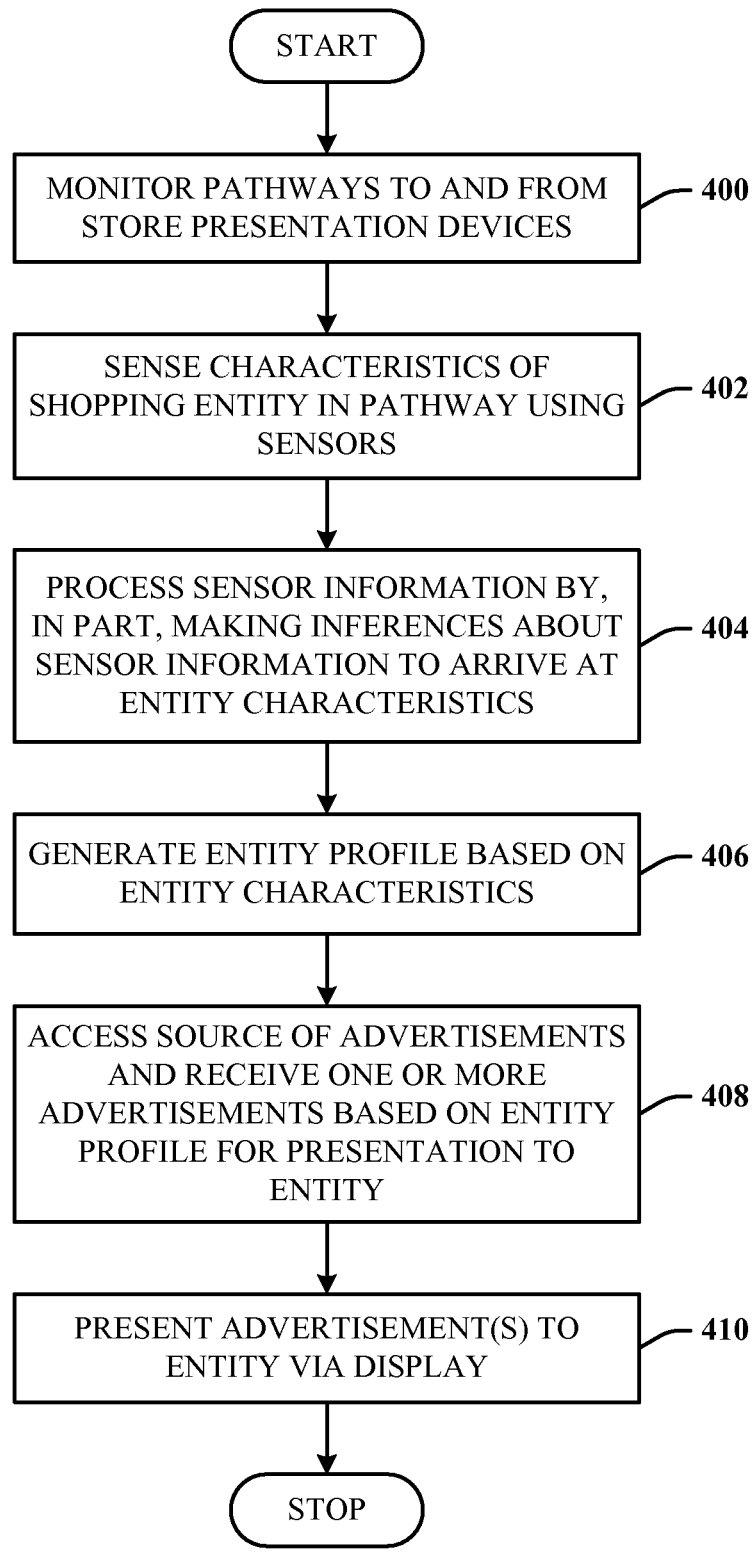
FIG. 4 illustrates a flow diagram of a methodology of providing targeted advertising to an entity such as a group of customers, in accordance with another aspect of the innovation.
Figure 5:
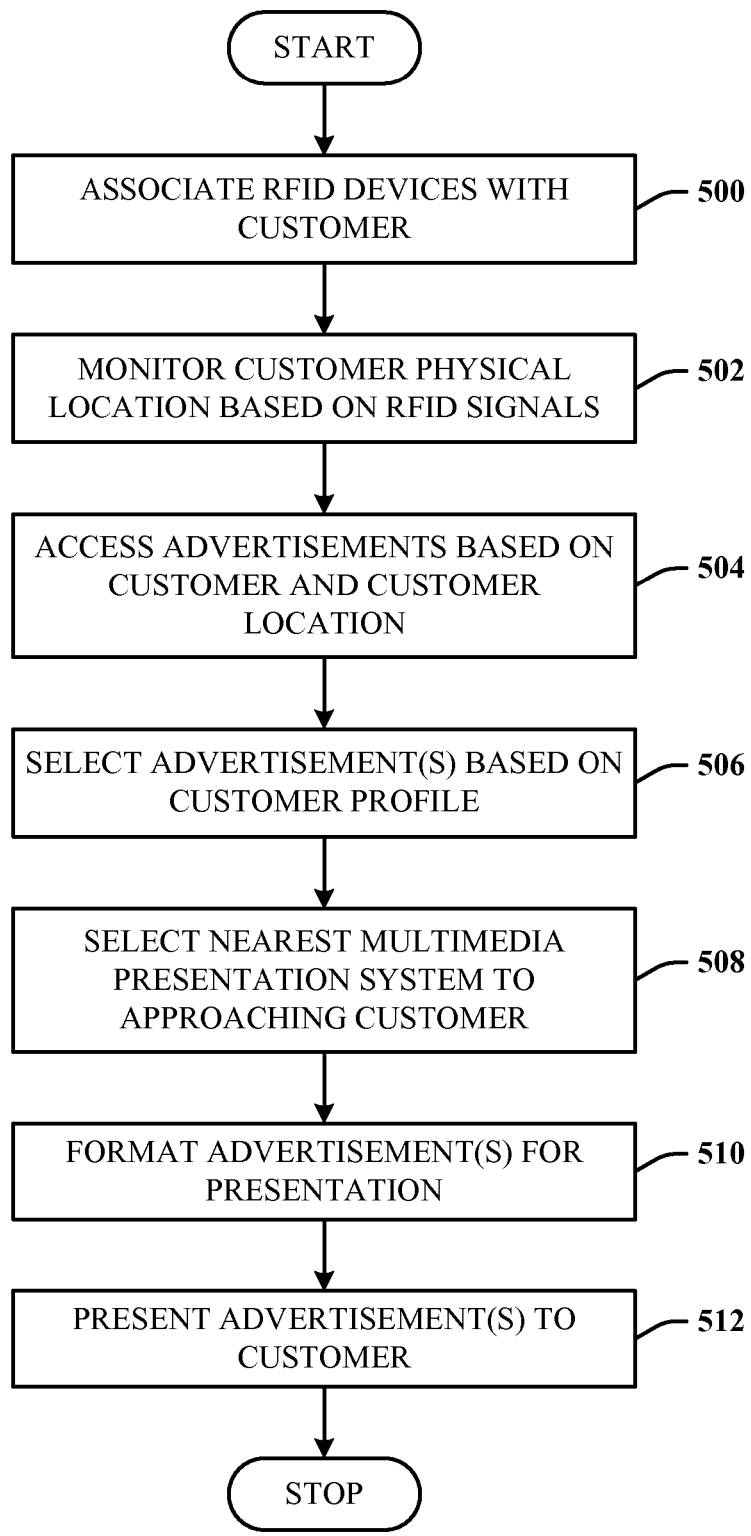
FIG. 5 illustrates a methodology of utilizing RFID technology in accordance with an aspect.

FIG. 4 illustrates a flow diagram of a methodology of providing targeted advertising to an entity such as a group of customers, in accordance with another aspect of the innovation. At 400, utilizing the sensing system, monitor pathways (e.g., aisles) to and from the presentation devices and/or systems of the store for customers and customer behavior. At 402, characteristics of the customer entity in a pathway are sensed. This can be to determine if the entity is a single customer or a multiplicity of customers moving as a group. At 404, sensor information is processed by, in part, making inferences about the sensor information to arrive at entity characteristics. At 406, an entity profile is developed based on the entity characteristics. At 408, an advertisement database is accessed and one or more advertisements relevant to the profile retrieved based on the entity profile, and for presentation to the entity. At 410, the advertisements are presented to the entity via the presentation devices and/or systems when the entity is within a predefined proximity thereof FIG. 5 illustrates a methodology of utilizing RFID technology in accordance with an aspect. At 500, RFID devices are associated with a customer. This can be by tagging products and/or services with RFID devices that can be scanned at checkout, for example. At 502, the sensor system monitors location of the customer or customer group based on readings made of the RFID tags of customer selected products as the customer moves throughout the store. At 504, advertisements are accessed based on the customer and/or customer location. At 506, the advertisements can be filtered further by accessing and processing the customer profile. At 508, the nearest multimedia presentation system to the customer is selected. At 510, advertisements are formatted for presentation on the selected presentation system. At 512, the advertisement(s) are then presented when the customer comes within proximity of the selected system.

Figure 6:
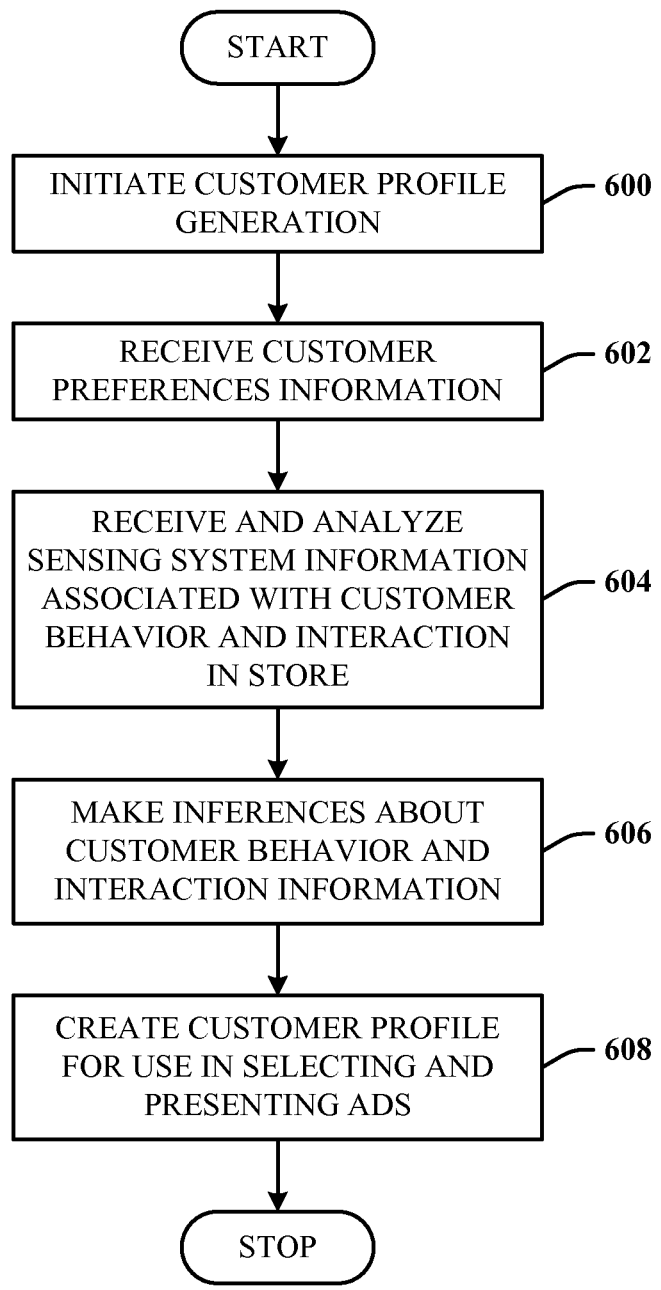
FIG. 6 illustrates a methodology of creating a customer profile for targeted advertising accordance with the disclosed innovation.

Referring now to FIG. 6, there is illustrated a methodology of creating a customer profile for targeted advertising accordance with the disclosed innovation. At 600, a customer profile generation process is initiated. At 602, customer preferences information can be received and utilized as part of the profile. Preferences information can be received as part of a subscription process for receiving benefits or promotions from the store. At 604, sensor information associated with customer behavior and interaction in the store is received and analyzed. At 606, inferences can be made about the customer behavior and interaction information. At 608, the final customer profile is generated for use in selecting and presenting advertisements, and stored for future use.

Figure 7:
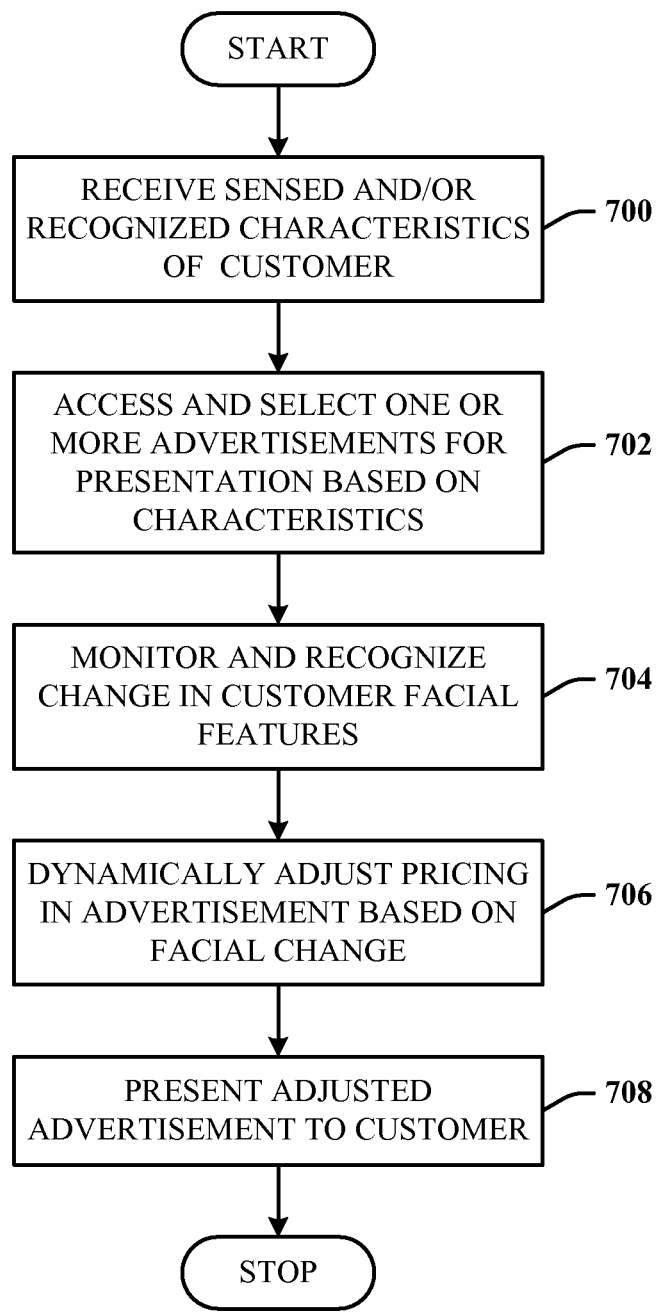
FIG. 7 illustrates a methodology of adjusting advertisement pricing based on facial recognition.

FIG. 7 illustrates a methodology of adjusting advertisement pricing based on facial recognition. At 700, sensed and/or recognized customer characteristics are received. At 702, one or more advertisements are selected for presentation based on the characteristics. At 704, changes in the customer face are monitor and recognized. At 706, pricing in the originally selected advertisements is adjusted upward or downward based on the facial expressions of the customer. For example, if the facial expression indicates a negative reaction, the pricing can be reduced dynamically. At 708, the adjust pricing and the advertisement are presented to the customer from the nearest presentation system.

Figure 8:
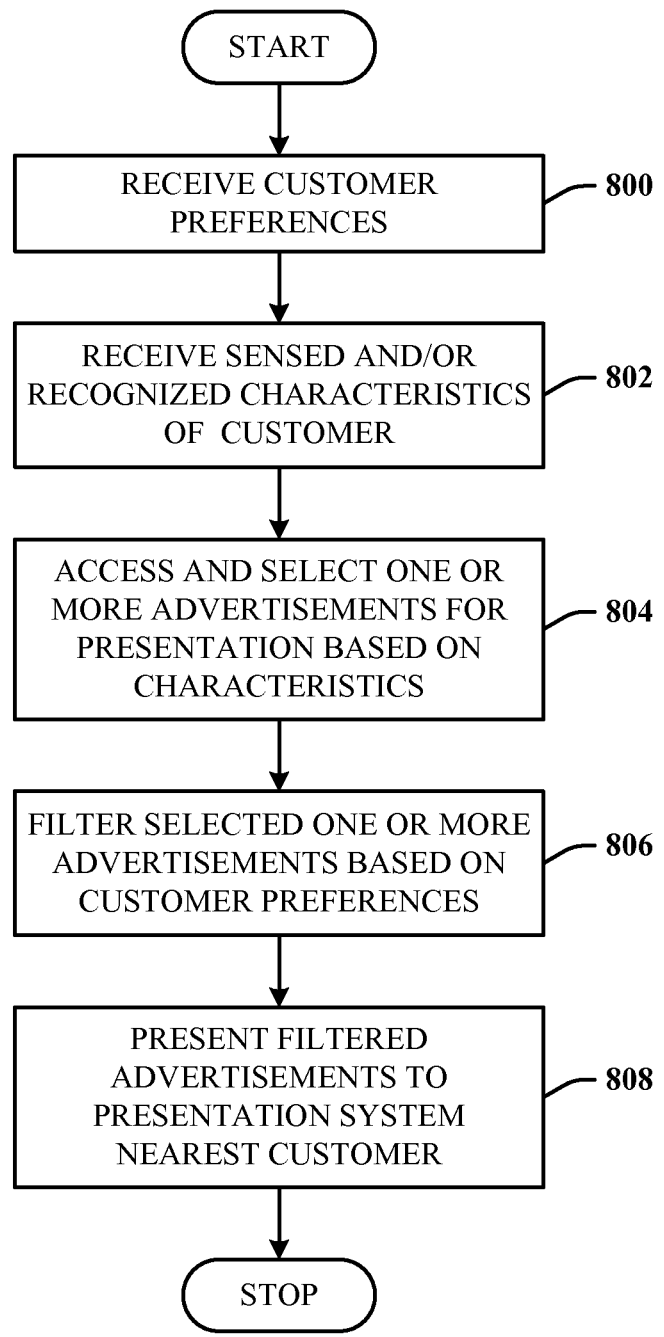
FIG. 8 illustrates a methodology of filtering advertisements based on customer preferences, according to another aspect.

FIG. 8 illustrates a methodology of filtering advertisements based on customer preferences according to another aspect. At 800, customer preferences are received. Again, this can be via a subscription process and/or during the transaction process at the checkout counter where customer information is received and entered, either generally or based on the purchase of particular products and/or services. At 802, sensed and/or recognized customer characteristics are received. At 804, one or more advertisements are selected for presentation based on the characteristics. At 806, one or more advertisements selected are filtered based on the customer preferences. At 808, the filtered advertisements are presented to the customer via the nearest presentation system.

It is also to be understood that customer wish lists can be accessed and processed to determine what advertisements to present to the customer as s/he moves throughout the store. Many websites offer such wish list capability for online purchasing. Accordingly, the wish lists can be accessed and utilized for brick-and-mortar shopping by the same customer who generated the online wish list.

Preferences can also include accessing other reminder programs such as calendars, for example. Thus, when reminders are triggered, these can be routed for processing at the retail establishment, and related advertising presented as reminders to the associated customer.

Figure 9:
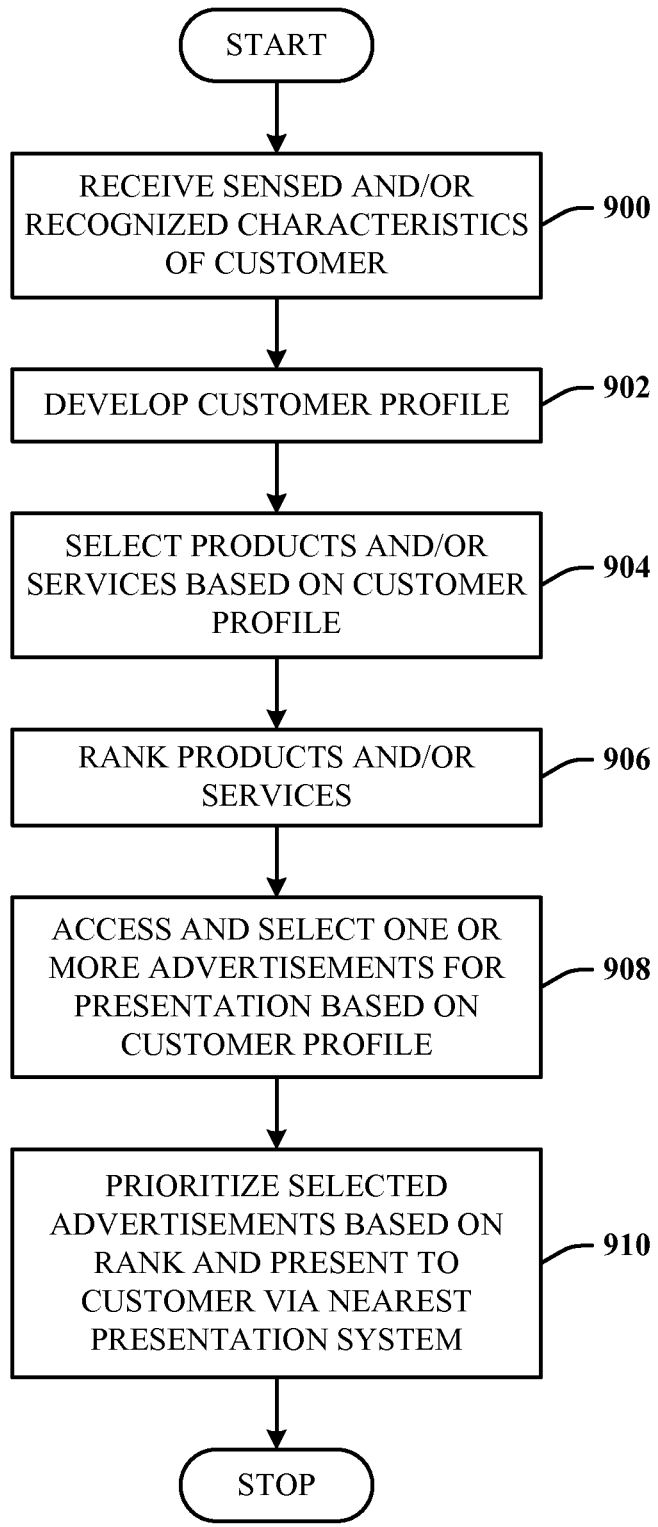
FIG. 9 illustrates a methodology of presenting advertisements based on ranked products and/or services preferred by a customer.

FIG. 9 illustrates a methodology of presenting advertisements based on ranked products and/or services preferred by a customer. At 900, sensed and/or recognized customer characteristics are received. At 902, a customer profile is developed. At 904, products and/or services are selected based on the profile. At 906, the selected products and/or services are ranked. Ranking can be based on any number of different criteria. For example, ranking can be based seasonal information, the day the customer is shopping, holiday information, weather information, and so on. At 908, one or more advertisements are selected for presentation based on the customer profile. At 910, the selected advertisements are prioritized based on rank and presented to the customer via the nearest presentation system.

Figure 10:
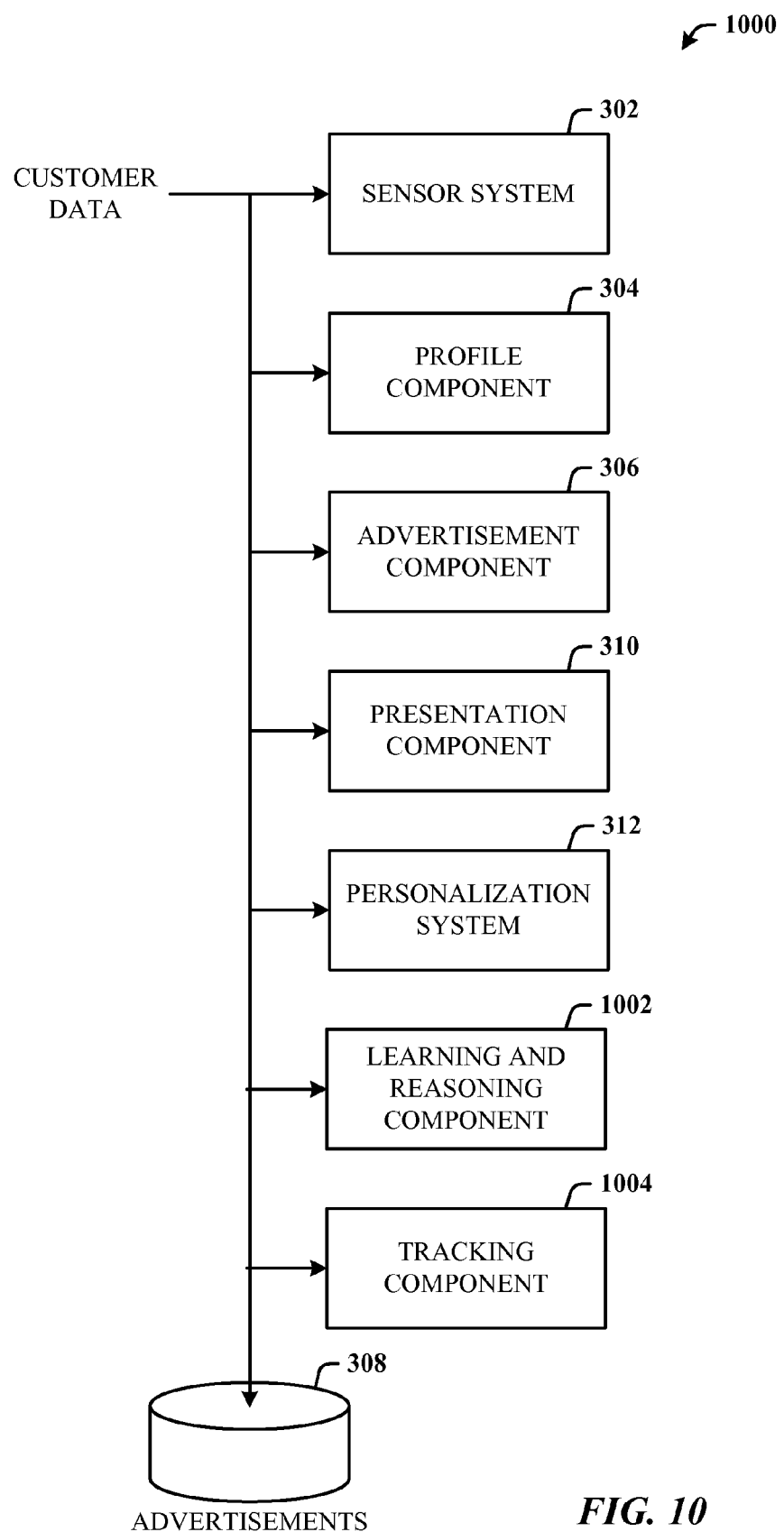
FIG. 10 illustrates a system that employs a machine learning and reasoning component which facilitates automating one or more features in accordance with the subject innovation.

FIG. 10 illustrates a system 1000 that employs a machine learning and reasoning (MLR) component 1002 which facilitates automating one or more features in accordance with the subject innovation. MLR can be utilized separately or in combination with the other components such as the sensor system 302, the customer profile component 304, the advertisement component 306, the presentation component 310, and the personalization component 312. At tracking component 1004 facilitates tracking customer interaction behavior.

The subject invention (e.g., in connection with selection) can employ various MLR-based schemes for carrying out various aspects thereof. For example, a process for determining what advertisements to select can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis (e.g., one factoring into the analysis utilities and costs to maximize the expected value to one or more people) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, naive Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g. via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In one implementation, MLR can be employed using feedback of aggregated data and personalized data. Data can further include trust behavior, low price and highest brand rating information.

In another implementation, the MLR component 1002 facilitates advertising optimization based on relative utility. For example, related to brand advertising, it can be inferred that, based on the customer profile, the advertisement should be related to one brand rather than another brand, given that there are several brands to choose from for presentation.

In yet another implementation, the MLR component 1002 can be employed as part of the retail establishment system to determine when bidding can be utilized as part of the sales process. As a promotional aspect, bidding can be provided on certain items, such as big ticket items (e.g., appliances) that can typically sell slower than consumable items (e.g., foodstuffs).

Learning and reasoning can also be utilized to discern regularities related to product ranking (and associated advertisement ranking), brand pricing, and novelty of the product and/or service at any moment in time. Automated adjustments to any of these parameters can be made based on changing conditions in the retail establishment, locale, or marketplace, in general, for example. Moreover, relevance of the advertisement can be parameterized and processed as part of the process for selecting and presenting advertisements to a customer. Relevance can be based on such information as product brand, price, and proximity of the customer to the products.

Figure 11:
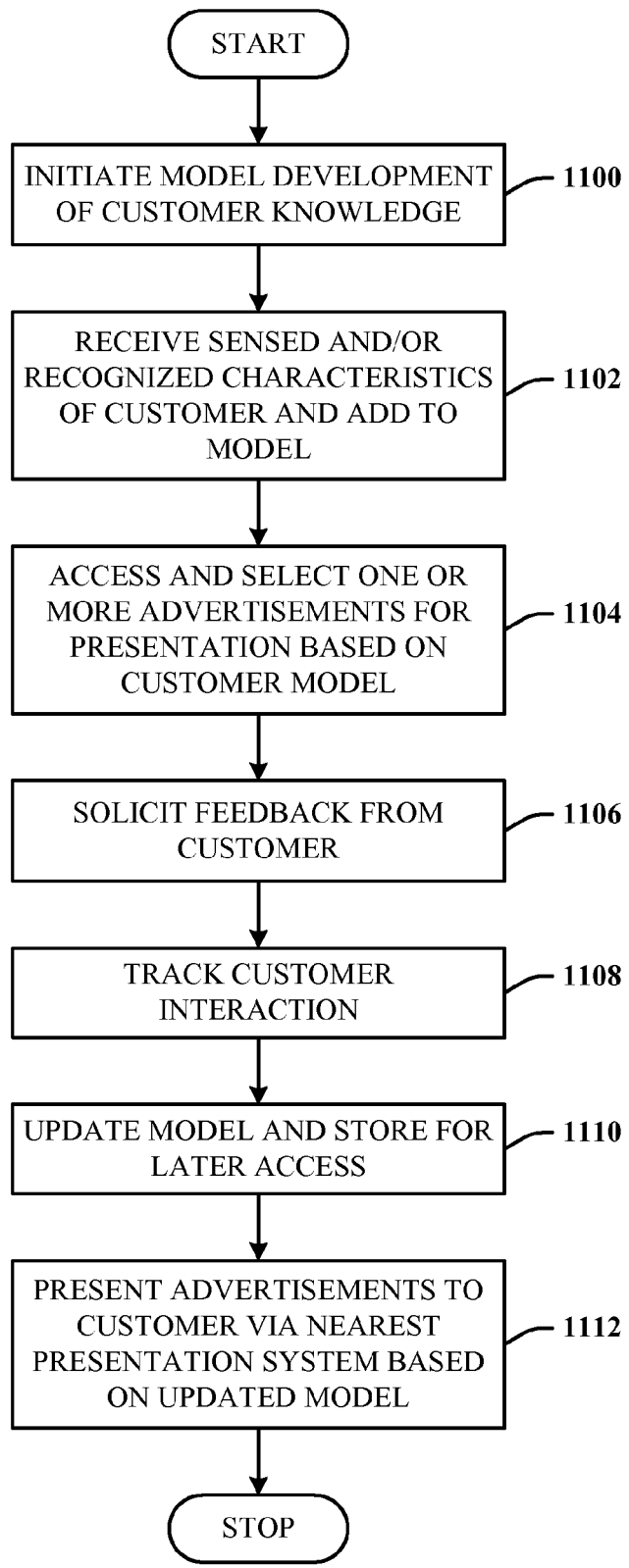
FIG. 11 illustrates a flow diagram of a methodology of modeling customer knowledge in accordance with an aspect.

FIG. 11 illustrates a flow diagram of a methodology of modeling customer knowledge in accordance with an aspect. At 1100, model development of customer knowledge is initiated. At 1102, sensed and/or recognized customer characteristics are received and added to the model. At 1104, one or more advertisements are selected for presentation based on the model. At 1106, feedback can also be solicited from the customer. This can be accomplished via speech recognition and/or direct input to the system. At 1108, customer interaction is tracked. At 1110, the model is updated and stored for later access. At 1112, advertisements are presented via the nearest presentation system based on the customer model.

Figure 12:
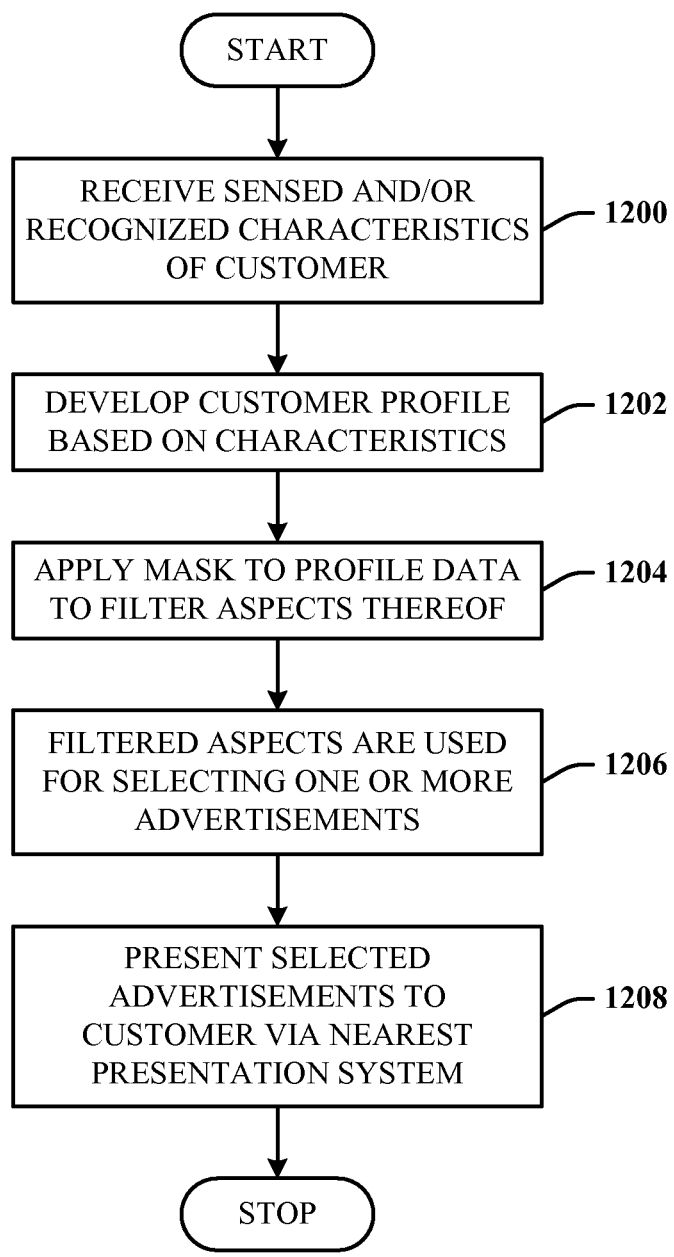
FIG. 12 illustrates a flow diagram of a methodology of masking aspects of the customer profile for advertisement selection and presentation.

FIG. 12 illustrates a flow diagram of a methodology of masking aspects of the customer profile for advertisement selection and presentation. At 1200, sensed and/or recognized customer characteristics are received. At 1202, a customer profile is developed based on the characteristics. At 1204, a mask is applied to the profile to filter aspects thereof. At 1206, the filtered aspects are utilized for selecting one or more advertisements. At 1208, the one or more selected advertisements are presented to the customer via the nearest presentation system.

Figure 13:
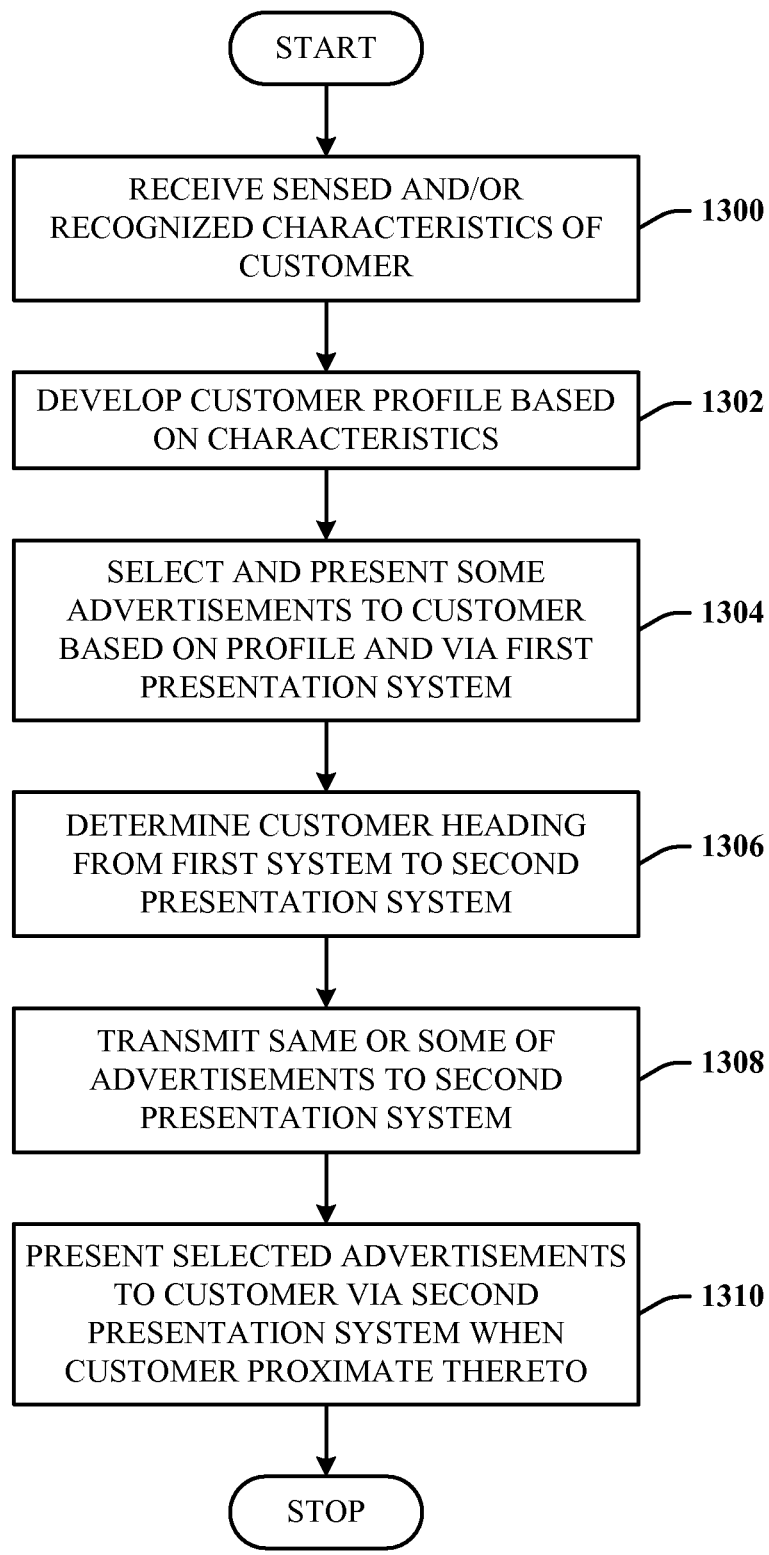
FIG. 13 illustrates a methodology of synchronizing advertisement presentation across multiple presentation systems based on customer movement.

FIG. 13 illustrates a methodology of synchronizing advertisement presentation across multiple presentation systems based on customer movement. At 1300, sensed and/or recognized customer characteristics are received. At 1302, a customer profile is developed based on the characteristics. At 1304, one or more advertisements are selected based on the customer profile, and via a first presentation system, when the customer is proximate to the first system. At 1306, the system determines the customer heading from the first system to a second presentation system. At 1308, some or all of the advertisements are transmitted to the second presentation system. At 1310, some or all of the advertisements are presented to the customer as the customer passes by the second system.

Figure 14:
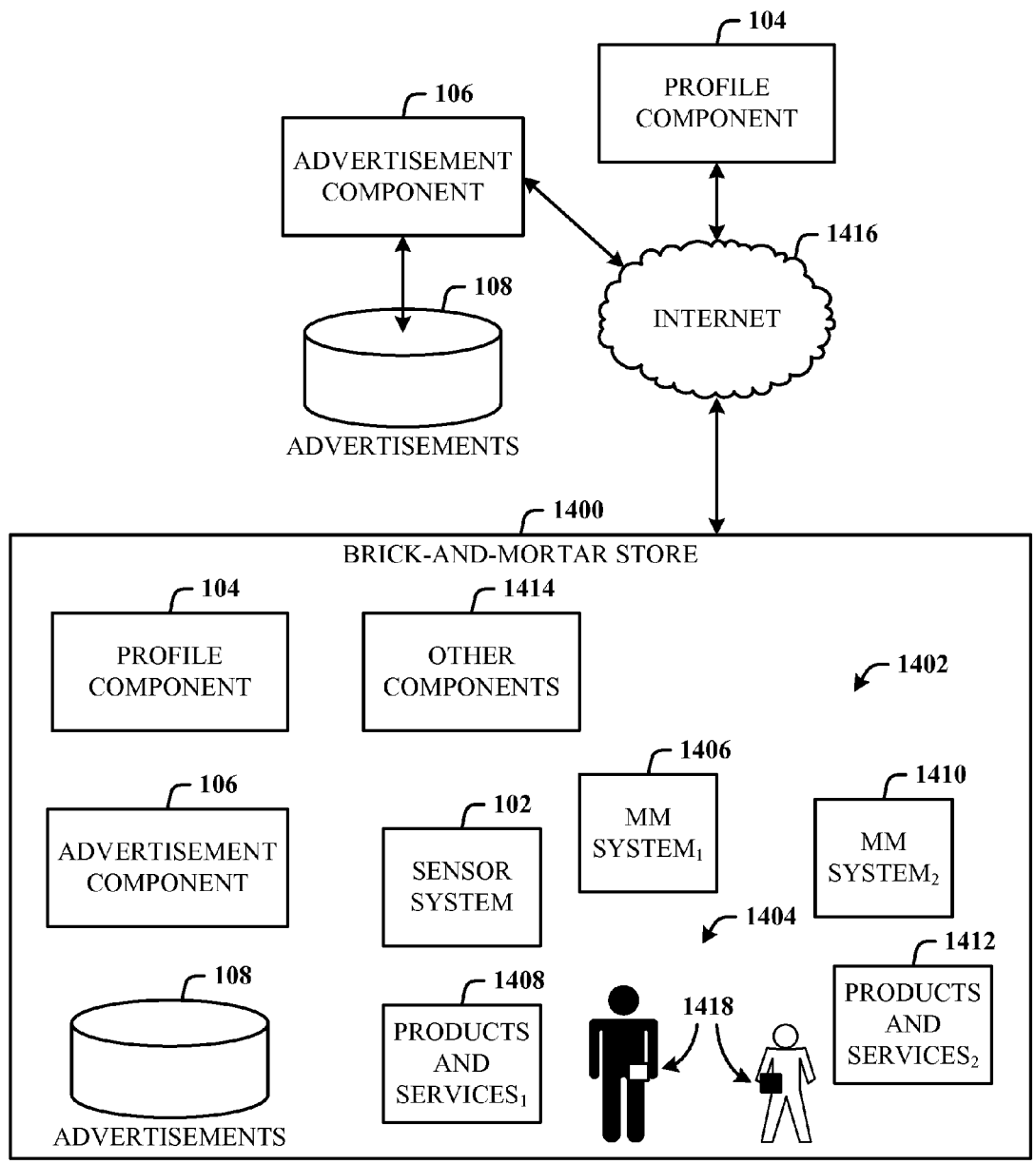
FIG. 14 illustrates a brick-and-mortar store that utilizes the advertising architecture of the subject innovation.

FIG. 14 illustrates a brick-and-mortar store 1400 that utilizes the advertising architecture of the subject innovation. The store 1400 can include components of the system 100 of FIG. 1. For example, the sensor system facilitates sensing many aspects of the customer and store environment. The profile component 104 facilitates creation and processing of a customer profile. Based on the profile, the advertisement component 106 facilitates selection of one or more advertisements from the advertisement datastore 108.

The store 1400 can also include multiple multimedia presentation systems 1402 (denoted MM SYSTEM$_1$ and MM SYSTEM$_2$), associated with corresponding products and/or services (denoted PRODUCTS AND SERVICES$_1$ and PRODUCTS AND SERVICES$_2$). Thus, the sensor system 102 can comprise many distributed subsets of sensor subsystems for monitoring one or more customers 1404 as they move throughout the store 1400. Here, a first presentation system 1406 can be associated with a first set of products and services 1408 and a second presentation system 1410 can be associated with a second set of products and services 1412. If the customers 1404 shop as a group, advertisements can be selected and presented based on a group profile. Alternatively, the presentation systems (1406 and 1410) can operate independently to present advertisements to the individual customers 1404 independently as they move separately throughout the store 1400.

The store system can also include an other components block 1414 that includes one or more other components described herein (e.g., the personalization component or tracking component).

Alternatively, or in combination therewith, the advertising component 106 with advertisement datastore 108, and profile component 104 can be disposed external to the store 1400 as a web-based system on the Internet 1416. Accordingly, advertisements can be downloaded to the store systems for presentation to the customers 1404 either through the store systems or directly to the presentation systems (1406 and 1410) for presentation.

In an alternative implementation, each person carries a personal ID device 1418 that not only uniquely identifies that person, but can also store user profile information associated with may different types of user interaction including, but not limited to, the person's purchase history using one or more credit cards, web search history, travel history, medical information, family information, and both online and offline activity, user preferences related to products and services, preferred device settings such as for television viewing, audio settings, and so on. The profile can be updated seamlessly. Additionally, the device information can be encrypted got transformed in such a way that the privacy information is protected. Accordingly, the device 1418 is more than a portable wireless device as is currently known (e.g., a cell phone or a portable computer).

In operation, when the customers 1404 enter the store 1400, the profile information is communicated to the sensor system 102 for system processing. The profile information is then processed, as before, to aid in extracting and presenting advertisements to the user when s/he approaches a presentation system, for example system 1406.

In another example, if there are multiple people (and hence, profiles) in front of the system 1406, the sensor system 102 accesses all profiles of the many users 1418, passes it to the profile component 104, after which the advertisement component 106 receives and processes the collective profiles via the profile component 104 and produces one or more collectively optimized advertisements targeting the "group". Collective targeting can be via time sharing, common interest, etc.

In yet another implementation, the system operates to process store customers with the device 1418 and for those customers 1404 that do not have the device 1418. In this mixed scenario, the system operates as described supra, by obtaining the profile information from an online source for those customers who do not have the device 1418 and facilitates collective targeted advertising for all of the customers who may approach the system 1406 as a group.

This process of creating a seamless profile and improving return on investment for brick-and-mortar/online systems addresses a much broader market than existing systems.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
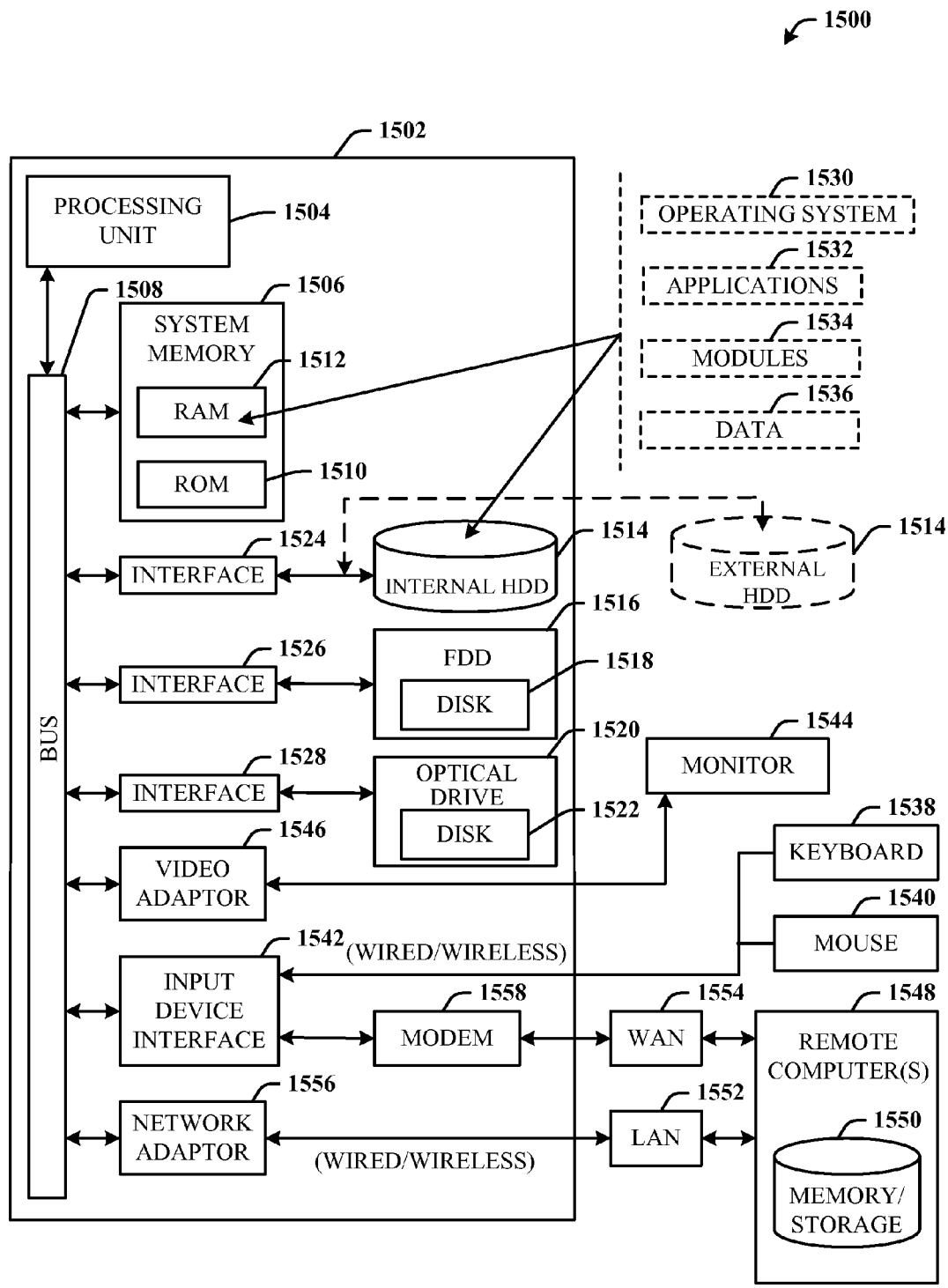
FIG. 15 illustrates a block diagram of a computer operable to execute the disclosed web-based brick-and-mortar advertising architecture.

Referring now to FIG. 15, there is illustrated a block diagram of a computer operable to execute the disclosed web-based brick-and-mortar advertising architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 16:
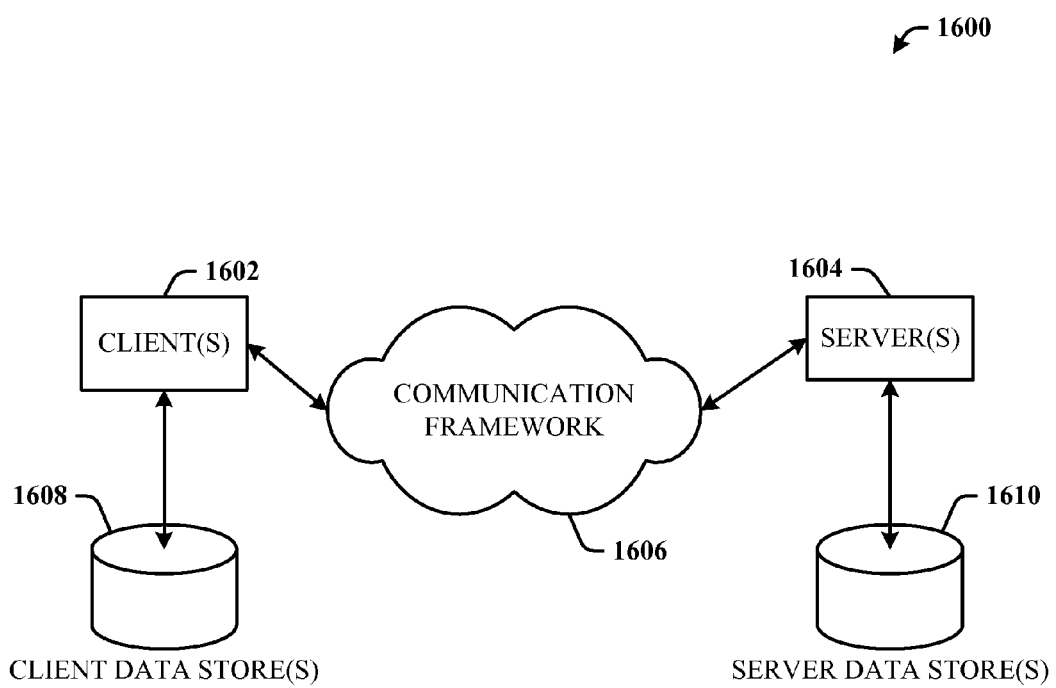
FIG. 16 illustrates a schematic block diagram of an exemplary computing environment that facilitates web-based brick-and-mortar advertising in accordance with another aspect.

Referring now to FIG. 16, there is illustrated a schematic block diagram of an exemplary computing environment 1600 that facilitates web-based brick-and-mortar advertising in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates presentation of targeted advertisements to an individual, comprising:

a sensor component of a retail establishment that collects sensor information associated with a specific individual proximate to a presentation system;

a customer component that analyzes the sensor information and generates a profile about the specific individual, the customer component further comprising:

an inference component that makes an inference about the specific individual based on some or all of the sensor information collected by the sensor component of the retail establishment as part of generating the profile; and a storage component that stores historical data of the specific individual and transaction data associated with transactions conducted by the specific individual; and an advertisement component that facilitates dynamic presentation of a targeted advertisement to the specific individual as a function of the profile.

2. The system of claim 1, wherein the sensor component further facilitates at least one of image processing, audio processing, light sensing, velocity sensing, direction sensing, proximity sensing, face recognition, pose recognition, transaction recognition, or biometric sensing.

3. The system of claim 1, wherein the inference component comprises a machine learning and reasoning system that employs a probabilistic and/or statistical-based analysis to prognose or infer an action that a user desires to be automatically performed.

4. The system of claim 1, wherein the advertising component presents the targeted advertisement via a display proximate to the individual.

5. The system of claim 1, wherein the retail establishment is a brick-and-mortar facility.

6. The system of claim 1, further comprising a presentation system that receives the advertisement from the advertisement component and presents the advertisement for perception by the individual.

7. The system of claim 1, further comprising a personalization component that customizes the advertisement to the individual prior to presentation.

8. The system of claim 1, further comprising a tracking component for tracking interaction behavior of the individual based on the presentation of the advertisement.

9. A computer-implemented method of advertising content to customers of a retail establishment, comprising:

a sensor system comprising one or more sensors, collecting sensor information at the retail establishment about at least one individual of the retail establishment;

processing the sensor information to derive characteristics of the at least one individual, the processing comprising, in part, making inferences about the at least one individual from the sensor information collected at the retail establishment, historical data and transaction data associated with the at least one individual to arrive at the characteristics of the at least one individual;

generating, by a customer component executed at least in part by a processor, a profile for the at least one individual based on the characteristics of the at least one individual;

selecting one or more advertisements for presentation to the at least one individual based on the profile for the at least one individual; and displaying the one or more advertisements to the at least one individual via a display when the at least one individual is proximate the display.

10. The computer-readable storage media of claim 9, further comprising dynamically streaming the one or more advertisements from a network source to the advertisement component for presentation to the entity.

11. The computer-readable storage media of claim 9, further comprising presenting information to the entity at least one of as the entity approaches the display or as the entity moves away from the display.

12. The computer-readable storage media of claim 9, further comprising presenting article of commerce information on demand by the entity.

13. The computer-readable storage media of claim 9, further comprising modeling knowledge of the entity based on entity interaction.

14. The computer-readable storage media of claim 9, further comprising automatically adjusting pricing of an article of commerce of the retail establishment based on the sensor information that facilitates recognition of one or more entity characteristics.

15. The computer-readable storage media of claim 9, wherein the one or more advertisements selected in the act of selecting are based on preferences of an entity user.

16. The computer-readable storage media of claim 9, further comprising tracking location of the entity utilizing a radio-frequency identification technology.

17. The computer-readable storage media of claim 9, further comprising masking a profile of the entity selectively and dynamically.

18. A method comprising:

collecting, by one or more sensors, sensor information at a brick-and-mortar establishment about a shopping customer of the brick-and-mortar establishment;

processing, by a customer component executed at least in part by a processor, the sensor information to derive customer characteristics, which processing includes, in part, making inferences about the customer from the sensor information collected at the brick-and-mortar establishment, historical data and transaction data associated with the customer to arrive at the customer characteristics;

generating a customer profile based on the customer characteristics;

selecting an advertisement based on the customer profile; and presenting the advertisement to the customer via a multimedia system when the customer is in perception range of the advertisement as output by the multimedia system.

* * * * *